Nov. 18, 1952     E. A. FITZPATRICK     2,618,102
PLANT PROTECTOR
Filed Jan. 16, 1948
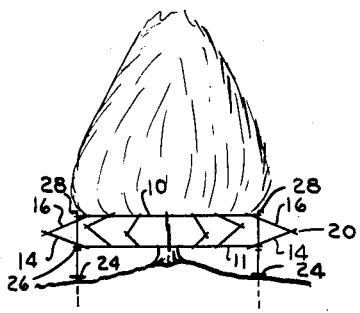
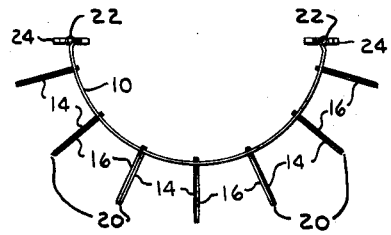
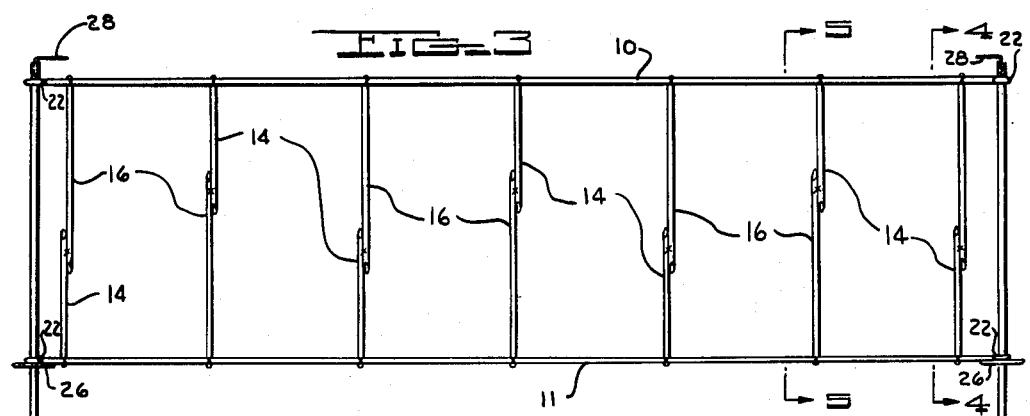
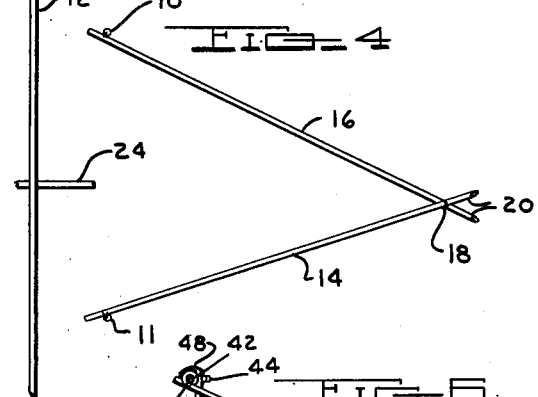
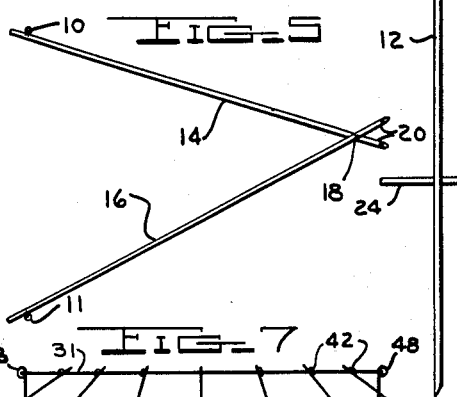
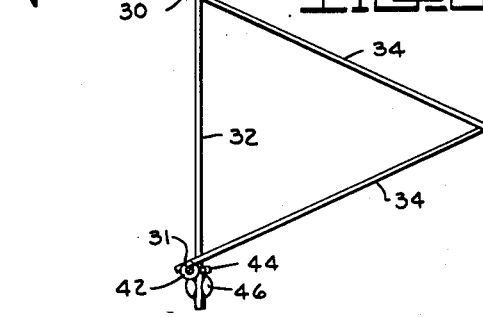
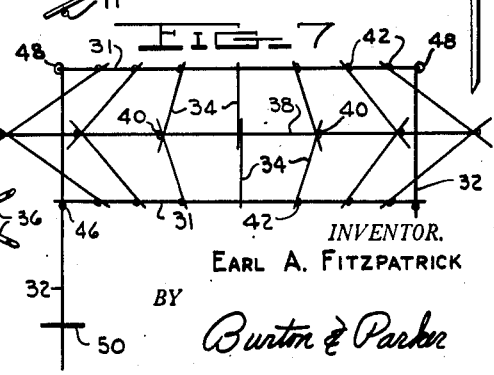
INVENTOR.
EARL A. FITZPATRICK
BY Burton & Parker
ATTORNEYS Patented Nov. 18, 1952

2,618,102

UNITED STATES PATENT OFFICE 2,618,102

PLANT PROTECTOR

Earl A. Fitzpatrick, Northville, Mich.

Application January 16, 1948, Serial No. 2,590

7 Claims. (Cl. 47—23)

This invention relates to a device for protecting plants and trees and particularly to a guard for preventing dog nuisances around evergreens and the like.

An important object of this invention is to provide a plant or tree protector composed of parts which are inexpensive to manufacture and assemble and which when installed at the base of a plant or tree is practically invisible yet highly effective in keeping dogs away from the tree. Another important object of this invention is to provide a device of this character having certain parts thereof formed of bendable material so that the guard may be shipped and handled in relatively flat condition and when installed may be bent to the desired curvature around the base of a plant or tree. A further important object of the invention is to provide a guard of this character composed practically entirely of wire members secured together in a novel manner so that short barbs are formed and arranged at different levels for preventing a dog or other animal from too closely approaching an evergreen or similar plant. A still further important object of this invention is to provide a guard of this character which is safe to use and is so constructed that the barbs will only penetrate a short distance if by any chance someone or an animal falls or lunges thereupon.

In carrying out the invention, two bendable wire members are connected together in spaced parallel relationship by a plurality of cross members which are so arranged in a novel manner to form laterally projecting barbs of relatively short length. The cross members each comprise a pair of prongs convergingly inclined with respect to one another and having their inner ends separately secured to the two bendable members and their outer ends secured to one another in such a manner to form a barb of a character like those commonly used on fences and the like. Associated with the guard are two anchor members of novel construction which are adapted to support the two parallel bendable wires in elevated position above the ground and in horizontal arcuate formation around the base of a plant or tree.

Various other objects, advantages, and meritorious features will become more fully apparent from the following specification, appended claims and accompanying drawings, wherein:

Fig. 1 is a side elevation of an evergreen showing one of the guards of this invention erected around the base thereof, Fig. 2 is a top plan view of a guard device of this invention bent in semi-circular formation preparatory to being anchored around the base of an evergreen or similar plant, Fig. 3 is a side elevation of the guard of this invention shown prior to being bent into arcuate formation, Fig. 4 is a vertical cross-sectional view taken along line 4—4 of Fig. 3, Fig. 5 is a vertical sectional view taken along line 5—5, Fig. 6 is a vertical sectional view similar to Figs. 4 and 5 illustrating a modification of the invention to provide complete collapsing of the wire members thereof together, and Fig. 7 is a side elevation of the guard device of Fig. 6.

In the illustrated embodiment of the invention the guard comprises two spaced parallel members 10 and 11 which in proper assembled position around a plant or tree extend horizontally and in spaced parallel relationship to one another. As indicated in Fig. 3, wire member 10 forms the upper horizontal member of the guard whereas wire member 11 forms the lower member. At each end of these members there is provided an anchoring rod 12 which is adapted to support the horizontal members 10—11 in elevated position above the ground and in superimposed relationship to one another. Extending between the horizontal members 10—11 are cross members each formed of a pair of prongs connected together adjacent to their outer extremities and at their inner ends to the members 10—11. Each pair of prongs is similar to the others and the reference numerals applied thereto correspond to all the others in the guard device. One prong of each cross member assembly is indicated at 14 and as shown in Figs. 4 and 5 is of shorter length than the other prong member. The other prong member of each cross member assembly is indicated at 16 and they are initially made with a slightly greater length than the prongs 14. The prongs are relatively stiff and may be sections of #14 gauge wire.

The prong members 14 and 16 are secured to the top and bottom horizontal members 10—11 in alternately staggered relationship to one another so that one prong member, such as 14, is secured alternately to the top member 10 and then to the bottom member 11 as shown while the other prong member 16 is disposed opposite the prong 14 with which it is paired. The prong members 14 and 16 project outwardly laterally of the plan of the two horizontal members 10—11 and in converging angular relationship to one another as shown in Figs. 4 and 5. Adjacent to their outer extremities each pair of prong members cross one another and are rigidly secured together at their crossing point by spot welding or other suitable means. For example, in Figs. 4 and 5, the prong members of each pair cross one another at 18 short of their outer extremities to form a barb 20. The outer extremities may be sharpened as shown as is customary in barbs of this character on fences and the like. The inner ends of each prong member 14 and 16 are rigidly secured by spot welding or the like to the top and bottom members 10—11 in the manner shown in Figs. 4 and 5. The rigid spot welding connections of these bars 14 and 16 to one another at their crossing point 18 and to the top and bottom members 10—11 predispose the latter in spaced parallel relationship.

The vertical rod members 12—12 herein above referred to are formed of wire members of relatively thick dimension such as #9 gauge wires. For the purpose of removably securing these vertical rods to the ends of the horizontal members 10—11, the latter are bent or looped at their outer extremities to form eyes 22 through which the rods may slide. Carried on the rods 12—12 are two abutments which may be formed of short lengths of wires rigidly secured thereto by spot welding or otherwise. One short wire member of this character is indicated at 24 relatively close to the lower end of the rod 12. The other short member of this character is indicated at 26 and as shown is located in spaced relationship above the abutment 24. This last abutment 26 serves as a rest upon which the bottom wire 11 may bear as indicated in Fig. 3. The lower abutment 24 serves as a stop element limiting the penetration of the rod into the ground as shown in Fig. 1.

There may be welded or otherwise secured to the upper end of each vertical rod 12 a short length of a bendable wire section 28 which after the guard is assembled may be bent as shown in Fig. 3 to prevent accidental disassembly. Initially, the short bendable wire sections 28 extend straight up in substantial alignment with the rods 12, but once the guarding device has been assembled thereon they may be bent as shown to lock the device against removal.

As previously mentioned the horizontal members 10—11 of the device are formed of bendable wire material. These members are preferably #12 gauge wire and soft annealed so that when the device is installed around an evergreen or other plants or tree they are capable of being readily bent by manual force into desired arcuate formation such as that shown in Fig. 2. Thus two or more of these guarding device members are assembled around the base of a tree and depending upon the size of a tree may be bent into semi-circular formation shown in Fig. 2 or into greater or lesser arcs. After the guarding device has been bent into the desired arcuate formation, which causes the pairs of prong members 14 and 16 to diverge away from one another, the vertical rods 12—12 are forced into the ground to anchor the device. The abutments 24 on each anchoring rod 12 serve to limit the penetration thereof into the ground so that the guarding device is supporting in elevated position above the ground.

In the manufacture of the guarding device the prong members 14 and 16 are cut to the desired lengths. For example the shorter prong members 14 may be 6" long and the longer prong member 16 may be 7" long. By alternating connecting the rods 14 and 16 of each pair of cross members to the horizontal members 10—11, the barb ends thereof are disposed in staggered or zigzag relationship on two different levels in the manner shown in Fig. 3. This forms a more effective protector preventing any size of dog from approaching too close to the base of the tree.

In the modification of the invention illustrated in Figs. 6 and 7, the converging pairs of wire sections forming the barbs are so connected to one another and the horizontal members that the device may be collapsed flat for shipment and handling prior to installation around a tree. Referring to Figs. 6 and 7, the modified form of device comprises two horizontal wire members 30 and 31 corresponding respectively to the members 10 and 11 previously described and two vertical anchoring rods 32—32 corresponding to the rods 12—12 of the earlier described embodiment of the invention. Pivotally connected to the horizontal wire members and projecting laterally from one side thereof are a plurality of converging pairs of wire sections 34—34. These wire sections are of the same length as one another and each pair crosses one another adjacent to but short of their extremities to form the barb 36. A third horizontal wire member 38 parallels the members 30 and 31 adjacent to the outer ends of the converging pairs of wire sections 34—34 and forms pivotal support therefor. The third wire member 38 is made slightly longer in length than the wire members 30 and 31 as shown in Fig. 7 in order that when the three wire members are arcuately bent around a tree they may traverse approximately the same angular distance. Each wire section 34 is pivotally connected at its outer extremity to the horizontal member 38 preferably by forming a loop 40 which encircles the member 38 as shown in Fig. 6. The inner diverging end of each wire member is preferably similarly looped as at 42 for pivotal connection to either the horizontal wire member 30 or 31 as the case may be. By virtue of these pivotal connections, it is possible to collapse the two wire sections 34—34 together and bring the two horizontal members 30 and 31 in side by side relation to form a flat assembly for shipment and handling.

The opposite ends of the horizontal wire members 30 and 31 are looped as at 44 to form eyes for receiving the anchoring rods 32—32 in a manner like that shown at 22 in the previously described embodiment of the invention. Each rod 32 may be flattened or pinched intermediate its ends as at 46 to provide an abutment larger in size than the eyes 44 upon which the lower horizontal member 31 may rest as shown in Fig. 6. The upper end of each anchoring rod may be provided with a short extension of narrower bendable wire material similar to the wire section 28 of the previously described modification in order to bend the same around the upper wire member 30 and hold the same in place, or the upper end section of each anchoring rod may be flattened as shown at 48 in Fig. 6 in order to make it readily bendable for this purpose. Normally the flattened end section or extension projects substantially parallel to the rod 32 in order to facilitate the insertion of the eyes 44 therethrough, after which the flattened section or extension is bent over to hold the upper wire member against sliding movement on the rod.

When assembling this modification, the horizontal wire members 30 and 31 are first pulled apart the desired distance thus pivoting the wire sections 34—34 on the third horizontal member 38 and opening the prongs of the barb 36. Thereafter the anchoring rods are slid through the eyes 44 bringing the abutment 40 up against the eye of the lower wire member 31 and upon bending the upper end of the anchoring rods around the upper member 30 the assembly is maintained in relatively rigid condition. The horizontal wire members may be curved to the desired arcuate formation either before or after the anchoring rods are assembled. The anchoring rods 32—32 may have short transverse wire sections 50 adjacent to their lower ends to limit penetration into the ground and thereby support the guard device at the proper height.

As a result of this invention there has been provided a plant protector formed wholely of wire sections and which in operating position provides an effective yet safe guard for the purpose designed. The end sharpened prongs or wire sections 14, 16 and 34—34 cooperate in a novel manner to form barbs at their outer extremities, and the crossing relation of these wire members to one another prevent any deep penetration in the event the body of an animal or man should strike the same. In use the horizontal wire members 10, 11, 30 and 31 and the anchoring rods are usually concealed within the foliage of the plant or three. Only the outer ends of the prong members may be visible and since the guard device may be painted green the exposed ends are inconspicuous.

What I claim is:

1. A protector for shrubbery and the like comprising, a pair of wire members, a set of prongs associated with each wire member and secured thereto in longitudinally spaced apart relationship, each set of prongs projecting from one side of their respective wire member and convergingly toward the other set of prongs, the outer end portions of said prongs crossing one another short of their extremities and being rigidly secured together at said crossing point so as to support the wire members in substantially parallel spaced apart relationship to one another, said wire members being formed of bendable metal material and capable of being bent into corresponding arcuate formations to divergingly project each pair of secured prongs from one another.

2. A shrub protector comprising, in combination, a pair of wire members of bendable material each being looped at its opposite ends to form an eye, a set of prongs of like number connected to each wire member and projecting outwardly laterally from one side thereof, each prong of one set being so angularly related to a prong of the other set that their outer end portions cross one another short of their extremities and being rigidly connected together at said crossing point to supportingly secure the wire members in substantially parallel spaced apart relationship to one another, the outer extremities of each pair of connected prongs beyond the crossing point thereof being sharpened to form barb, and a ground anchoring rod for each end of said pair of wire members removably fitting the eyes thereof and means on each anchoring rod for supporting the wire members in elevated horizontal position above the ground and in substantially parallel superimposed relation to one another.

3. A guard for protecting evergreens and the like comprising, in combination, a pair of wire members of bendable material, a set of prongs of like number connected to each wire member in longitudinally spaced apart relation and projecting outwardly laterally from one side thereof, each prong of one set being disposed opposite a prong of the other set and so angularly related to one another that their outer end portions cross one another short of their extremities to form a barb, the prongs of one set alternating in length with respect to the prongs of the other set so as to dispose the barbs in alternately staggered relationship from one end of the two sets of prongs to the other end thereof.

4. A guard for protecting evergreens and the like comprising, in combination, a pair of bendable wire members each being looped at its opposite ends to form an eye, a set of prongs of like number connected to each wire member and projecting outwardly laterally from one side thereof, each prong of one set being disposed opposite a prong of the other set and so angularly related to one another that their outer end portions contactually cross one another short of their extremities to form a barb, one prong of each crossing pair of prongs being slightly longer than the other prong and alternately connected to one or the other of said wire members so as to dispose the barbs formed by each pair of prongs at different alternately staggered levels on the guard, and a ground anchoring rod slidably receivable through the eyes at each end of said wire members and provided with means thereon for supporting the wire members in elevated substantially horizontal position above the ground and in vertically spaced apart relationship to one another.

5. A protector for shrubbery and the like comprising, in combination, a pair of wire members, a vertical ground anchoring rod for each end of said pair of wire members for supporting the wire members in elevated position above the ground and in spaced parallel relationship one above the other, a set of prongs connected to the upper wire member in longitudinally spaced apart relationship therealong and extending outwardly laterally from one side thereof at a downward inclination, a corresponding set of prongs connected to the lower wire member in the same longitudinal spaced apart relationship therealong as the prongs of the upper wire member and extending outwardly laterally from the same side as the prongs of the upper wire member but at an upward inclination, the outer end portions of each corresponding pair of prongs substantially contactually crossing one another short of their respective extremities, the outer extremities of each pair of connected prongs beyond the crossing point thereof being sharpened to form a barb, said wire members being formed of bendable metal material and capable of being bent into corresponding arcuate formations about a vertical axis located on the side of the wire members opposite to that from which the prongs extend to divergingly project each pair of connected prongs from one another.

6. A protector for shrubbery and the like comprising, in combination, a pair of bendable wire members, a vertical ground anchoring rod for each end of said pair of wire members for supporting the same in elevated position above the ground and in spaced parallel relation one above the other, a set of prongs rigidly connected to the upper member in longitudinal spaced apart relation therealong and projecting outwardly laterally from one side thereof at a downward inclination, a corresponding set of prongs rigidly connected to the lower wire member in the same longitudinal spaced apart relationship as the prongs of the upper wire member and projecting laterally therefrom at an upward inclination, the outer end portions of each corresponding pair of prongs carried by said wire members crossing one another short of their extremities to form a barb, means rigidly connecting each corresponding pair of prongs at their crossing point, the crossing points of the corresponding pairs of prongs being staggered so as to dispose the barbs at alternately higher and lower levels relative to the ground.

7. A protector for shrubbery and the like comprising a pair of wire members, a set of prongs associated with each wire member and secured thereto in longitudinally spaced apart relationship, each prong of one set being disposed substantially opposite a companion prong of the other set, said sets of prongs projecting from the same sides of their respective wire members and arranged in converging relationship to one another, and the outer end portion of each prong of one set substantially contactually crossing its companion prong of the other set short of their respective extremities to form a barb.

EARL A. FITZPATRICK.

REFERENCES CITED

The following references are of record in the file of this patent:

UNITED STATES PATENTS

| Number | Name | Date |
|---|---|---|
| 186,716 | Decker | Jan. 30, 1877 |
| 339,823 | Taggart | Apr. 13, 1886 |
| 494,325 | Curtis | Mar. 28, 1893 |
| 1,901,700 | Carpenter | Mar. 14, 1933 |